US006619183B2

United States Patent
Yoshino

(10) Patent No.: US 6,619,183 B2
(45) Date of Patent: Sep. 16, 2003

(54) ELECTROHYDRAULIC VALVE ASSEMBLY

(75) Inventor: Kazunori Yoshino, Kobe (JP)

(73) Assignees: Caterpillar Inc, Peoria, IL (US); Shin Cat Mitsubishi Ltd (JP)

( * ) Notice: Subject to any disclaimer, the term of this patent is extended or adjusted under 35 U.S.C. 154(b) by 0 days.

(21) Appl. No.: 10/004,837

(22) Filed: Dec. 7, 2001

(65) Prior Publication Data

US 2003/0106419 A1 Jun. 12, 2003

(51) Int. Cl.⁷ ............................................... F15B 11/08
(52) U.S. Cl. ..................... 91/454; 137/596.16
(58) Field of Search ................. 91/454, 441, 452; 60/468; 137/596.16

(56) References Cited

U.S. PATENT DOCUMENTS

| | | |
|---|---|---|
| 3,430,540 A | 3/1969 | Linz |
| 3,870,074 A | 3/1975 | Hanser et al. |
| 4,138,632 A | 2/1979 | Pauwels et al. |
| 4,706,932 A | 11/1987 | Yoshida et al. ............... 91/454 |
| 5,067,321 A | 11/1991 | Miyaoka ..................... 60/468 |
| 5,165,320 A | 11/1992 | Ravn ........................... 91/454 |
| 5,868,059 A | * 2/1999 | Smith .......................... 91/454 |
| 5,960,695 A | 10/1999 | Aardema et al. ............. 91/454 |

* cited by examiner

Primary Examiner—Edward K. Look
Assistant Examiner—Thomas E. Lazo
(74) Attorney, Agent, or Firm—Finnegan, Henderson, Farabow, Garrett & Dunner; Steve M Hanley

(57) ABSTRACT

A control valve in fluid communication with an actuator may include a pressurized pilot supply and a fluid reservoir fluidly connected to a passageway defined by a valve body. A pilot operator is selectively moveable within the passageway, and a flow metering operator is moveably disposed within the passageway. A fluid make-up operator, disposed in the passageway and in fluid communication with the fluid reservoir and the actuator, directs pressurized pilot supply fluid in response to a decrease in actuator pressure coinciding with a cavitation condition within the actuator. A control chamber within the valve body contains pressurized fluid from the pilot supply and is in fluid communication with the flow metering operator. The flow metering operator fluidly connects the actuator with the fluid reservoir under the influence of the pressurized fluid within the control chamber through activation by either the pilot operator or the fluid make-up operator.

20 Claims, 3 Drawing Sheets

ELECTROHYDRAULIC VALVE ASSEMBLY

TECHNICAL FIELD

The invention relates generally to an electrohydraulic valve assembly and, more particularly, to an independent metering valve having a fluid make-up function.

BACKGROUND

An independent metering valve includes a first pair of independently controlled electrohydraulic displacement controlled spool valves for controlling pump-to-cylinder communication between an inlet conduit and a pair of control conduits and a second pair of independently controlled electrohydraulic displacement controlled spool valves for controlling cylinder-to-tank fluid flow between the pair of control conduits and an outlet. Each of the spool valves has a displacement controlled solenoid valve for controlling the position of the spool valve. The spool valves are normally biased to a closed position and are selectively actuated to provide several modes of actuation.

This system can provide many functions normally requiring separate valves simply by actuating one or more of the four independently controlled electrohydraulic displacement controlled spool valves. However, one problem that arises is that the pressure control functions requiring fast response, such as pressure relieving and fluid make-up, typically require a line relief valve and a fluid make-up valve, respectively, to be installed on an actuator supply conduit. Both the line relief valve and fluid make-up valve are, many times, large in size and capacity.

In a more recent development, as disclosed in U.S. Pat. No. 5,868,059, the valve element of an independent metering valve includes both the fluid relief function and the fluid make-up function. A fluid make-up means provides communication between the control chamber of the valve and an actuator supply conduit so that the valve element moves to an open position when the fluid pressure in the supply conduit drops below a predetermined level. However, this independent metering valve has a relatively complicated valve structure.

The present invention is directed to overcoming one or more of the problems set forth above.

SUMMARY OF THE INVENTION

In one aspect of the present invention, a control valve in fluid communication with an actuator to controllably move an output member of the actuator may include a valve body defining a passageway, a pressurized pilot supply fluidly connected to the passageway, and a fluid reservoir fluidly connected to the passageway. A pilot operator is selectively moveable within the passageway, and a flow metering operator is moveably disposed within the passageway. A fluid make-up operator is disposed in the passageway and in fluid communication with the fluid reservoir and the actuator. The fluid make-up operator operates to direct an amount of pressurized pilot supply fluid in response to a decrease in actuator pressure coinciding with a cavitation condition within the actuator. A control chamber within the valve body is structured and arranged to contain pressurized fluid from the pressurized pilot supply. The control chamber is in fluid communication with the flow metering operator. The flow metering operator is urged to fluidly connect the actuator with the fluid reservoir under the influence of the pressurized fluid within the control chamber through activation by either the pilot operator or the fluid make-up operator.

In another aspect of the invention, a method for controllably moving an output member of an actuator includes supplying a pressurized pilot supply fluid to a passageway defined by a valve body. The passageway includes a control chamber. The method also includes selectively moving a pilot operator within the passageway and controllably moving a flow metering operator within the passageway to provide fluid communication between the actuator and a fluid reservoir. A fluid make-up operator is provided in the passageway and in fluid communication with the fluid reservoir and the actuator. The method includes operating the fluid make-up operator to direct an amount of pressurized pilot supply fluid in response to a decrease in actuator pressure coinciding with a cavitation condition within the actuator, and activating either the pilot operator or the fluid make-up operator to urge the flow metering operator to fluidly connect the actuator with the fluid reservoir under the influence of the pressurized fluid within the control chamber It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
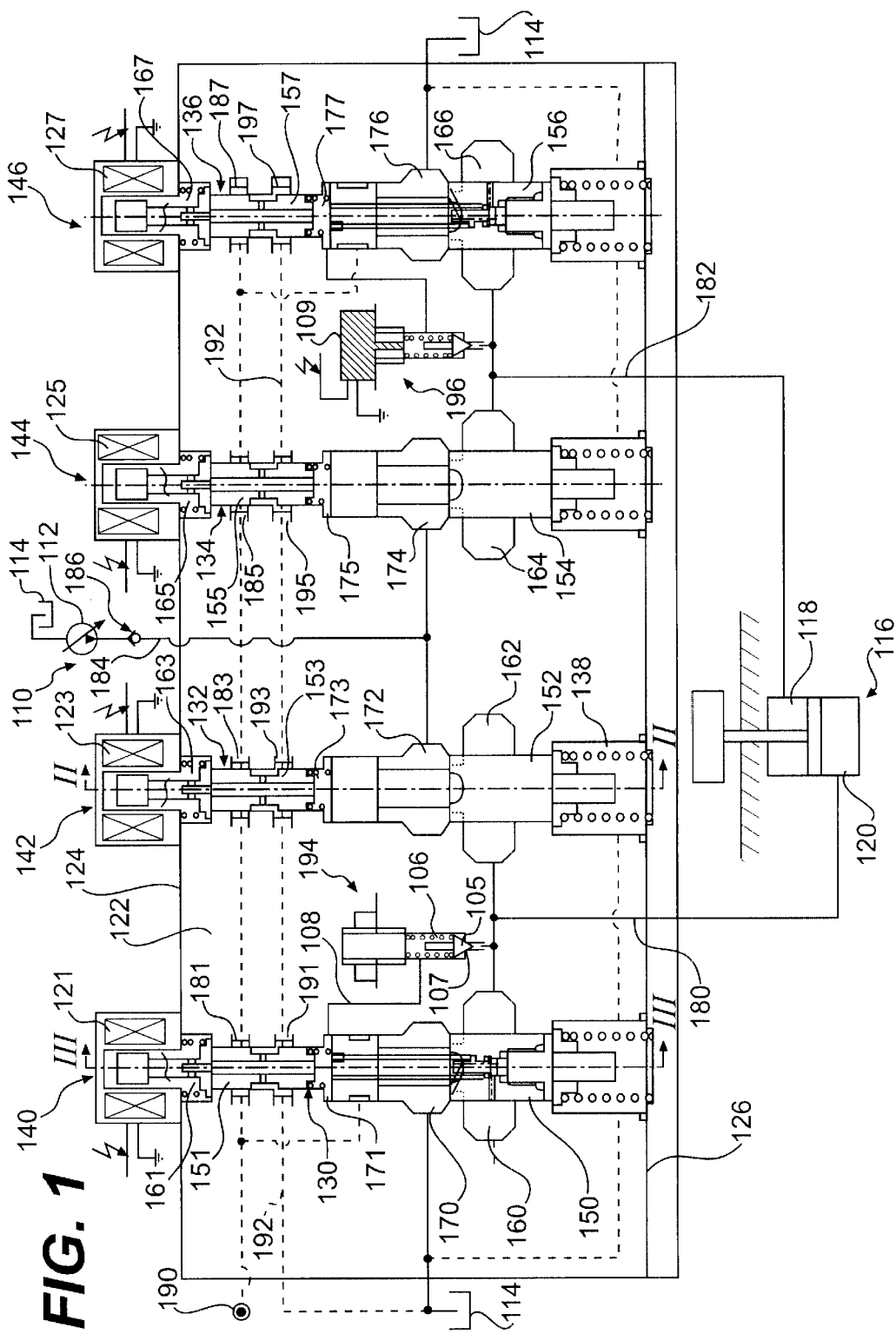
FIG. 1 is a diagrammatic and schematic illustration of an embodiment of the present invention with portions shown in cross-section for illustrative convenience.

In accordance with the present invention, an electrohydraulic valve assembly is provided. Referring to FIG. 1, an electrohydraulic valve assembly 110 is shown in combination with a main pump 112, a fluid reservoir such as a tank 114, and an actuator such as a hydraulic cylinder 116. The main pump 112 may include, for example, a high pressure pump. The hydraulic cylinder 116 may include, for example, a rod end chamber 118, a head end chamber 120, and an output member 119. The valve assembly 110 includes a valve body 122 having a plurality of passageways 130, 132, 134, 136. The diameter of each passageway varies along its length. The valve assembly also includes a plurality of independently-operated, electronically-controlled metering valves 140, 142, 144, 146 individually seated in the passageways 130, 132, 134, 136, respectively.

Each metering valve 140, 142, 144, 146 includes a proportional electromagnetic device 121, 123, 125, 127, respectively, at a proximal end 124 of the valve body 122. Throughout the description of the invention, the term "proximal" will refer to a position or a direction toward the proximal end 124 of the valve body 122. The term "distal" will refer to a position or a direction toward the distal end 126 of the valve body 122, which lies opposite the proximal end 124.

The plurality of metering valves 140, 142, 144, 146 control fluid flow between the pump 112, the tank 114, and the hydraulic cylinder 116. The metering valves are referred to individually as a cylinder-to-tank head end (CTHE) metering valve 140, a pump-to-cylinder head end (PCHE) metering valve 142, a pump-to-cylinder rod end (PCRE) metering valve 144, and a cylinder-to-tank rod end (CTRE) metering valve 146, as shown in FIG. 1.

Each metering valve 140, 142, 144, 146 includes a flow metering operator, for example, a metering spool. For example, the metering valve 140 includes a metering spool 150 slideably disposed within the passageway 130 for controlling fluid communication between a pair of annular cavities 160, 170, which are axially spaced along and open into the passageway 130. Similarly, a metering spool 152 of the metering valve 142 controls fluid communication between a pair of annular cavities 162, 172, a metering spool 154 of the metering valve 144 controls fluid communication between a pair of annular cavities 164, 174, and a metering spool 156 of the metering valve 146 controls fluid communication between a pair of annular cavities 166, 176.

A head end cylinder conduit 180 provides fluid communication between the annular cavities 160, 162 and the head end chamber 120 of the hydraulic cylinder 116. A rod end cylinder conduit 182 connects the annular cavities 164, 166 with rod end chamber 118 of the hydraulic cylinder 116. An inlet conduit 184 provides communication between the pump 112 and the annular cavities 172, 174 and contains a load-hold check valve 186. Tank conduits, for example, annular cavities 170, 176 are fluidly connected to the tank 114.

Each metering valve 140, 142, 144, 146 also includes a pilot operator, for example, a control spool. For example, the metering valve 140 includes a control spool 151 slideably disposed within the passageway 130 between a pair of control chambers 161, 171, which are axially spaced along the passageway 130 and configured to hydraulically balance the control spool 151. Similarly, a control spool 153 of the metering valve 142 is hydraulically balanced between a pair of control chambers 163, 173, a control spool 155 of the metering valve 144 is hydraulically balanced between a pair of control chambers 165, 175, and a control spool 157 of the metering valve 146 is hydraulically balanced between a pair of control chambers 167, 177.

In addition, the metering valve 140 includes a second pair of annular cavities 181, 191 located in the valve body 122. The annular cavities 181, 191 are axially spaced along and open into the passageway 130 within the axial range of the control spool 151. Annular cavities 183, 193 are similarly configured in the metering valve 142, annular cavities 185, 195 are similarly configured in the metering valve 144, and annular cavities 187, 197 are similarly configured in the metering valve 146.

A pilot supply 190 provides a low pressure fluid to the proximal annular cavities 181, 183, 185, 187 about the control spools 151, 153, 155, 157. The pilot supply 190 may include the main pump with an associated pressure reducing valve, a separate pilot pump with an associated relief valve, or any other conventional source of pressurized fluid known in the art. The distal annular cavities 191, 193, 195, 197 about the control spools 151, 153, 155, 157 are in fluid communication with the tank 114 via a common drain passage 192.

As shown in FIG. 1, pilot valves 194, 196 are connected to cylinder conduits 180, 182, respectively. One or both of the pilot valves 194, 196 may be configured as a needle valve. An exemplary pilot valve 194 is disposed at the cylinder conduit 180. The exemplary pilot valve 194 includes a valve spring 106 configured to urge a poppet 105 toward a closed position against a valve seat 107. A pilot valve passage 108 is configured to provide fluid communication between the cylinder conduit 180 and the distal control chamber 171 when fluid pressure in the cylinder conduit 180 urges the poppet 105 to an open position away from the valve seat 107.

Further, none, one, or both of the pilot valves 194, 196 may include an optional proportional electromagnetic device 109, for example, a solenoid, as shown associated with the exemplary pilot valve 196. The proportional electromagnetic device 109 provides the capability to adjust the force of the spring 106 acting on the poppet 105. Thus, the first predetermined pressure may be adjusted easily from an external location at any time and at the option of an operator.

Figure 2:
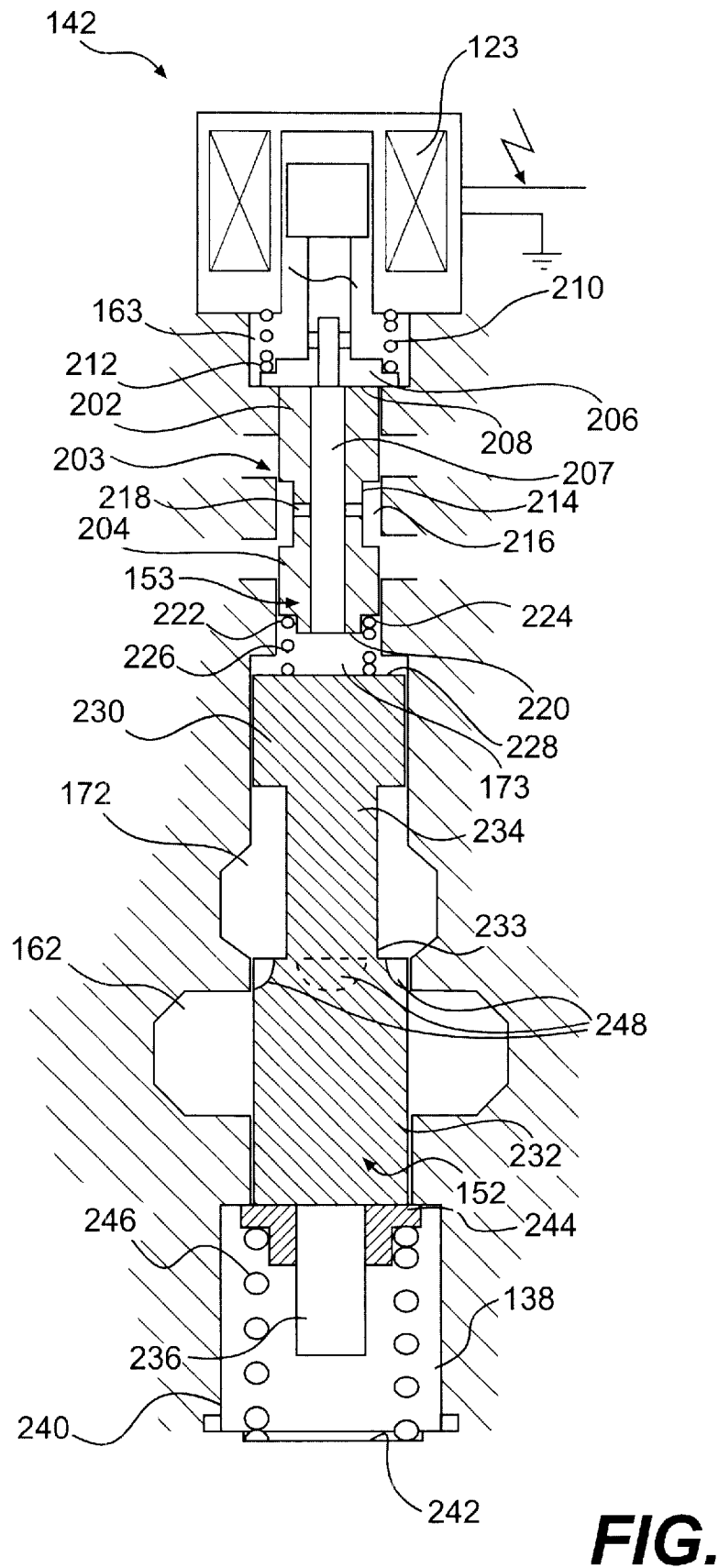
FIG. 2 is a cross-sectional view taken along line II—II of FIG. 1.

While FIG. 2 is a sectional view taken through the metering valve 142, it discloses the basic structural features of all four metering valves 140, 142, 144, 146. As shown in FIG. 2, the control spool 153 has a first land 202 axially spaced from a second land 204. A first limiting collar 206 is disposed at a proximal end 208 of the first land 202 and limits the movement of the control spool 153 in the distal direction. A first spring 210 is disposed in the proximal control chamber 163 between the electromagnetic device 123 and a spring shoulder 212 disposed on the first limiting collar 206.

The control spool 153 and the first limiting collar 206 include a longitudinal throughbore 207 extending the length thereof. The throughbore 207 provides fluid communication between the proximal control chamber 163 and the distal control chamber 173. As a result, the control spool 153 remains hydraulically balanced. The force of the first spring 210 biases the control spool 153 in a direction away from the electromagnetic device 123 to close communication between the annular cavity 183 and the passageway 132 and to open communication between the passageway 132 and the annular cavity 193.

The control spool 153 comprises a reduced-diameter portion 214 forming an annular chamber 216 between the axially-spaced lands 202, 204. The reduced-diameter portion 214 includes at least one transverse throughbore 218 that opens to the annular chamber 216, for example, at diametrically-opposed sides of the reduced-diameter portion 214. Additional throughbores may be provided to meet desired performance criteria. The distal end 220 of the control spool 153 also includes an annular groove 222 forming a distally-facing shoulder 224.

The control spool 153 and the metering spool 152 define the distal control chamber 173 within the passageway 132. A second spring 226 is disposed in the control chamber 173 between the distally-facing shoulder 224 of the control spool 153 and a proximal end 228 of the metering spool 152. Thus, the second spring 226 biases the control spool 153 away from the metering spool 152 and against the bias of the first spring 210.

The metering spool 152 comprises a first land 230 axially spaced from a second land 232 and a reduced-diameter portion 234 between the axiallyspaced lands 230, 232 and adjacent with the annular cavity 172. The metering spool 152 also comprises a reduced-diameter distal portion 236 disposed in a spring chamber 138. An expanded-diameter passageway 240 and the distal end 126 of the valve body 122 define the spring chamber 138. A groove 242 may be cut into the distal end 126 of the valve body 122. As shown in FIG.

1, the spring chamber 138 is in communication with the tank 114 so that any fluid leakage into the spring chamber 138 is drained.

A second limiting collar 244 is disposed on the distal portion 236 of the metering spool 152 and limits the movement of the metering spool 152 in a proximal direction. A third spring 246 is disposed between a shoulder of the collar 244 and the distal end 126 of the valve body 122. Thus, the third spring 246 biases the metering spool 152 in a direction toward the control spool 153.

The second land 232 of the metering spool 152 includes metering slots 248 at its proximal end 233. In one embodiment, the second land 232 comprises four metering slots 248 disposed in two diametrically-opposed pairs. The metering slots 248 may be semi-circular as shown in FIG. 2. However, it should be appreciated that the second land may include more or less than four metering slots. It should further be appreciated that the metering slots 248 may be shaped and positioned as necessary to achieve desired performance results. The metering slots 248 are configured to provide fluid communication between the annular cavities 162, 172 when the metering spool 152 moves distally a sufficient distance for the metering slots 248 to open to the annular cavity 162 .

Figure 3:
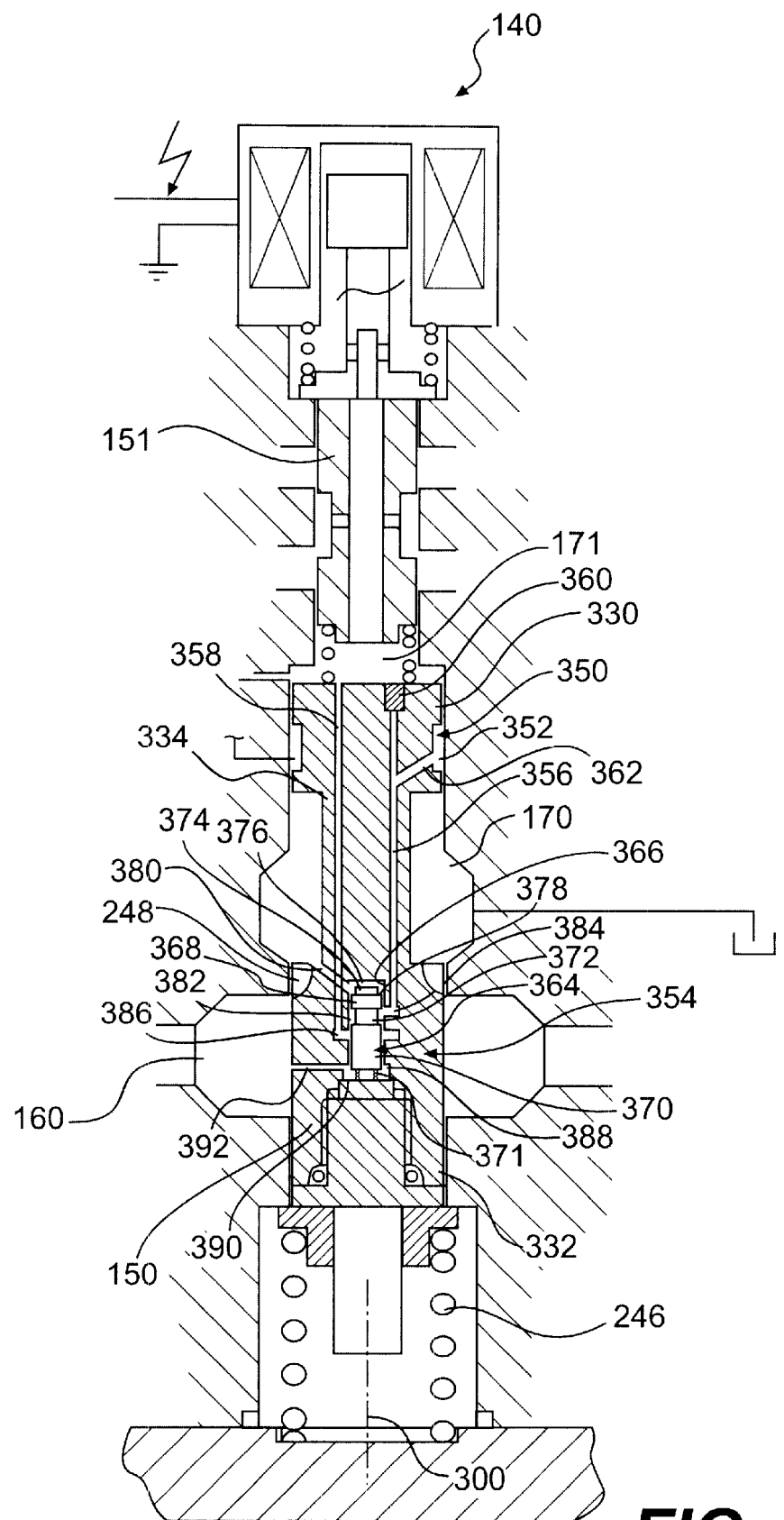
FIG. 3 is a cross-sectional view taken along line III—III of FIG. 1.

FIG. 3 shows additional structural detail specifically related to the metering valves 140, 146. The structural detail of metering valve 140, as illustrated in FIG. 3, is essentially identical to the structure of metering valve 146.

As shown in FIG. 3, a first land 330 of the metering spool 150 includes an annular groove 350 defining, in combination with the valve body 122, a pilot pressure chamber 352. A second land 332 of the metering spool 150 comprises a make-up valve 354 configured to provide make-up fluid in the event the cylinder conduit 180 reaches a cavitation condition.

A pair of longitudinal passages 356, 358 extend from the make-up valve 354 through the reduced-diameter portion 334 and first land 330 of the metering spool 150 and to the distal control chamber 171. A plug 360 is disposed at a proximal end of the first longitudinal passage 356 to close off the passage 356 from the distal control chamber 171. The second longitudinal passage 358 opens to the distal control chamber 171, thus being capable of providing fluid communication between the control chamber 171 and the make-up valve 354. The longitudinal passages 356, 358 may be positioned radially opposite to one another, substantially the same radial distance from a central longitudinal axis 300 of the metering valve 140, as shown in FIG. 3. However, it should be appreciated that the longitudinal passages may be positioned in an asymmetrical fashion as necessary to achieve desired performance results.

A first lateral passage 362 provides fluid communication between the first longitudinal passage 356 and the pilot pressure chamber 352. The first lateral passage 362 may extend diagonally between the first longitudinal passage 356 and the pilot pressure chamber 352, as shown, or it may extend radially perpendicular to the central longitudinal axis 300 of the metering valve 140. Again, it should be appreciated that the configuration of the first lateral passage 362 may be varied to achieve desired performance results.

The make-up valve 354 comprises a fluid make-up operator, for example, a valve element 364, slidably disposed in a valve passageway 366. The valve element 364 includes a first land 368 axially spaced from a second land 370 and a reduced-diameter portion 372 between the first and second lands 368, 370. The valve element 364 further includes a proximal end portion 374.

A head chamber 376 is defined between the proximal end of the valve passageway 366 and a proximal end 378 of the first land 368. A diagonally-extending second lateral passage 380 provides communication between the head chamber 376 and the annular cavity 170.

The reduced-diameter portion 372 of the valve element 364 and the valve passageway 366 define an annular chamber 382. A radially-extending notch 384 is formed in the valve passageway 366 and provides fluid communication between the annular chamber 382 and the first longitudinal passage 356. The valve passageway 366 also includes a first annular groove 386 axially spaced from the radial notch 384 in the distal direction. The first annular groove 386 is configured such that it provides fluid communication between the annular chamber 382 and the second longitudinal passage 358 in response to movement of the valve element 364 in the distal direction.

A second annular groove 388 is disposed at a distal end 390 of the valve passageway 366. A fourth spring 371, for example, a weakly loaded spring, is disposed between the second land 370 of the valve element 364 and the distal end 390 of the valve passageway 366. The fourth spring 371 urges valve element 364 in a direction away from the distal end 390 of the valve passageway 366.

A third lateral passage 392 is disposed in the second land 332 of the metering spool 150 and provides fluid communication between the second annular groove 388 and the cylinder conduit 180 through the annular cavity 160 (FIG. 1). The third lateral passage 392 may extend radially, perpendicular to the central longitudinal axis 300 of the metering valve 140. Again, it should be appreciated that the configuration of the third lateral passage 392 may be varied to achieve desired performance results.

Industrial Applicability

In use, the metering valves 140, 146 control cylinder-to-tank fluid flow while the metering valves 142, 144 control pump-to-cylinder fluid flow. Conventional extension of the hydraulic cylinder 116 is achieved by substantially simultaneous, operator-controlled actuation of the metering valves 142, 146, and retraction is achieved by simultaneous operator controlled actuation of the metering valves 144, 140.

For example, actuation of the valve 142 moves the metering spool 152 distally establishing fluid flow from the pump 112 to the head end chamber 120, and actuation of the metering valve 146 moves the metering spool 156 distally establishing fluid flow from the rod end chamber 118 to the tank 114. Similarly, actuation of the metering valve 144 moves the metering spool 154 distally establishing flow from the pump 112 to the rod end chamber 118, and actuation of the metering valve 140 moves the metering spool 150 distally establishing fluid flow from the head end chamber 120 to the tank 114.

Numerous less conventional operating modes can be achieved by actuation of a single metering valve or actuation of various combinations of two or more metering valves. However, an understanding of the primary features of the present invention can be achieved by describing the general operation of the metering valve 142 shown in FIG. 2 combined with the additional features of the metering valve 140, more specifically shown in FIG. 3.

When a proportional electromagnetic device 123, for example a solenoid, of PCHE metering valve 142 is energized, the first spring 210 is compressed. The control spool 153 is urged toward a proximal end 124 (FIG. 1) of the valve body 122 by the force of the second spring 226. As a result, the first land 202 moves axially toward the proximal end 124 such that the annular chamber 216 is opened to the pilot supply 190 (FIG. 1). The pilot supply 190 is then in fluid communication with the proximal and distal control chambers 163, 173 by way of the transverse throughbore 218 and the longitudinal throughbore 207.

The pressure of the fluid in the distal control chamber 173 acts on the proximal end 228 of the first land 230 urging the metering spool 152 in the direction toward the distal end 126 of the valve body 122. As a result, the compressed load of the second spring 226 is reduced, and the control spool 153 is urged toward the distal end 126 of the valve body 122 by the force of the first spring 210. As the control spool 153 moves axially in the distal direction, the first land 202 of the control spool 153 reduces the opening between the annular chamber 216 and the pilot supply 190. The opening between the annular chamber 216 and the pilot supply 190 and the opening between the annular chamber 216 and the tank 114 are reduced until the control chambers 163, 173 hydraulically balance the control spool 153.

As the opening between the annular chamber 216 and the pilot supply 190 is reduced, the metering spool 152 is urged in the direction of the proximal end 124 by spring 246 and the metering slots 248 provide fluid communication between the annular cavities 172, 162. Then, pump 112 provides pressurized fluid, via the load-hold check valve 186 and the supply conduit 184, to the annular cavity 172. From there, the pressurized fluid is metered to the annular cavity 162, which directs the fluid to the cylinder conduit 180, which in turn supplies the fluid to the head end chamber 120 of the hydraulic cylinder 116.

Likewise, a CTHE metering valve 140 may also be controlled with the aid of a proportional electromagnetic device, for example a solenoid. In the CTHE metering valve 140, the metering slots 248 provide communication between the annular cavities 160, 170. As a result, fluid in the cylinder conduit 180, received from the head end chamber 120, is supplied to the tank 114. The PCRE metering valve 144 and CTRE metering valve 146 function similarly to the PCHE metering valve 142 and CTHE metering valve 140, respectively, but in relation to the rod end chamber 118 of the hydraulic cylinder 116.

Referring to the CTHE metering valve 140, such as that shown in FIG. 3, when pressure of fluid in the cylinder conduit 180 exceeds a first predetermined pressure, an amount of the pressurized fluid must be released from the cylinder conduit 180. Release of the fluid reduces the pressure of the fluid in the cylinder conduit 180 and prevents potential damaging effects to the hydraulic circuit. If, on the other hand, the pressure of fluid in the cylinder conduit 180 drops below a second predetermined pressure, make-up fluid must be supplied to the cylinder 180 to prevent a cavitation condition.

As shown in FIG. 1, a pilot valve 194 is connected to the cylinder conduit 180. When the pressure of fluid in the cylinder conduit 180 exceeds a first predetermined pressure, the pressurized fluid in the cylinder conduit 180 urges the poppet 105 to an open position away from the valve seat 107 against the force of the valve spring 106. Pressurized fluid then flows through the pilot valve 194 and through the pilot valve passage 108 to the distal control chamber 171 at the proximal end 228 of the metering spool 150. The pressurized fluid then passes through the longitudinal throughbore 207 and the transverse throughbore 218 into the annular chamber 216 and out to the tank 114.

Since the proximal and distal pressurized fluid chambers 161, 171 are in communication with one another, the control spool 151 will not move since it is hydraulically-balanced.

As a result, fluid flowing from the pilot supply 190 and into control chamber 173 is restricted at location 203 (FIG. 2). However, rather than flow becoming choked at location 203, the pressure acts on the proximal end 228 of the metering spool 150 through the distal control chamber 171 and moves the metering spool 150 in a distal direction against the force of third spring 246 and the flow is relieved to the tank 114 through the metering slots 248.

As the metering spool 150 moves in an axial direction toward the distal end 126 of the valve body 122, the metering slots 248 provide fluid communication between the annular cavities 160, 170. Consequently, the pressurized fluid in the cylinder conduit 180 is relieved to the tank 114 through the annular cavities 160, 170 and the metering slots 248. Thus, the pilot valve 194 achieves the relief function for a large amount of pressurized fluid by operating the metering spool 150 to provide a substantial fluid path from the cylinder conduit 180 to the tank 114.

Further, as discussed above, one or both of the pilot valves 194, 196 may include an optional proportional electromagnetic device 109, for example a solenoid, thereby providing the capability to adjust the force of the spring 106 acting on the poppet 105. Thus, the first predetermined pressure may be adjusted easily from an external location at any time and at the option of an operator.

Referring again to FIG. 3, a make-up valve 354 is disposed in the metering spool 150. When the pressure of fluid in the cylinder conduit 180 drops below the second predetermined pressure, the make-up valve 354 functions in cooperation with the valving element 150 to supply pressurized fluid to the cylinder conduit 180 to prevent a cavitation condition.

As shown in FIG. 3, the pilot pressure chamber 352 is in fluid communication with the annular chamber 382 of the make-up valve 354 by way of first lateral passage 362, first longitudinal passage 356, and radial notch 384.

The tank 114 communicates with the head chamber 376 of the make-up valve 354 by way of annular cavity 170 and the diagonally-extending second lateral passage 380. Thus, the pressure of fluid in the tank 114 acts on the proximal portion 374 of the make-up valve element 364, compressing the fourth spring 371 in a direction toward the distal end 390 of the valve passageway 366. The cylinder conduit 180 is in communication with the distal end 390 of the valve passageway 366 by way of annular cavity 160, third lateral passage 392, and second annular groove 388.

When the cylinder conduit 180 approaches cavitation, the force acting against the second land 370 in a proximal direction becomes less than the force acting on the first land 368 in the distal direction. As a result, the make-up valve element 364 moves in a direction toward the distal end 126 of the valve body 122 against the force of the fourth spring 371. Consequently, pressurized fluid supplied by the pilot supply 190 flows from the pilot pressure chamber 352, through the first lateral passage 362, the first longitudinal passage 356, the radial notch 384, the annular chamber 382 of the make-up valve 354, and the second longitudinal passage 358 into the distal control chamber 171.

From the distal control chamber 171, the pressurized fluid supplied by the pilot supply 190 can pass through the longitudinal throughbore 207 and the transverse throughbore 218 into the annular chamber 216. Again, since the proximal and distal pressurized fluid chambers 161, 171 are in communication with one another, the control spool 151 will tend to remain in a hydraulically-balanced position. As a result, the opening between the annular chamber 216 and the pilot supply 190 and the opening between the annular chamber 216 and the tank 114 remain minimized. The flow of pressurized fluid is restricted at the opening between the annular chamber 216 and the tank 114, thus causing a resistant pressure. This resistant pressure acts on the proximal end 228 of the metering spool 150 through the distal control chamber 171 and moves the metering spool 150 in a distal direction against the force of the third spring 246.

As the metering spool 150 moves axially toward the distal end 126 of the valve body 122, the metering slots 248 provide fluid communication between the annular cavities 160, 170. Consequently, a make-up flow of fluid is supplied to the cylinder conduit 180 by way of the annular cavities 160, 170 and the metering slots 248, thereby eliminating the cavitation condition. Thus, the make-up valve 354 disposed in the metering spool 150 supplies a large amount of make-up fluid by operating the metering spool 150.

In view of the above, it is readily apparent that the structure of the present invention provides an improved and simplified electrohydraulic valve assembly in which the fluid make-up function is integrally formed as part of a metering valve. This provides fast response for pressure relieving and fluid make-up, without special pressure sensors and the need for increased microprocessor computing speed. Moreover, the structure of the assembly is relatively uncomplicated.

It will be apparent to those skilled in the art that various modifications and variations can be made in the electrohydraulic valve assembly without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A control valve in fluid communication with an actuator to controllably move an output member of the actuator, the control valve comprising:
    a valve body defining a passageway;
    a pressurized pilot supply fluidly connected to said passageway;
    a fluid reservoir fluidly connected to said passageway;
    a pilot operator selectively moveable within said passageway;
    a flow metering operator moveably disposed within said passageway;
    a fluid make-up operator disposed in said passageway and in fluid communication with said fluid reservoir and said actuator; and
    a control chamber within said valve body being structured and arranged to contain pressurized fluid from said pressurized pilot supply, said control chamber being in fluid communication with said flow metering operator, wherein said fluid make-up operator is operative to direct an amount of pressurized pilot supply fluid to the control chamber in response to a decrease in actuator pressure coinciding with a cavitation condition within the actuator,
    wherein said flow metering operator is urged to fluidly connect said actuator with said fluid reservoir under the influence of said pressurized fluid within said control chamber through activation by one of said pilot operator and said fluid make-up operator.

2. The control valve of claim 1, further including at least one passage in the flow metering operator, the fluid make-up operator, when opened, providing pressurized fluid from the pressurized pilot supply to the control chamber via the at least one passage.

3. The control valve of claim 1, wherein the flow metering operator includes at least one metering slot, the at least one metering slot configured to provide a flow path fluidly connecting the fluid reservoir and the actuator.

4. The control valve of claim 3, further including a passageway disposed in the flow metering operator, the fluid make-up operator being slidably disposed in the passageway of the flow metering operator.

5. The control valve of claim 3, wherein when the fluid make-up operator is opened, pressurized fluid flows to the control chamber urging the flow metering operator to move within the passageway and position the at least one metering slot to provide the flow path.

6. The control valve of claim 3, further including a pilot valve fluidly connected to one end of the actuator, the pilot valve being configured to relieve pressurized fluid from said one end of the actuator via the flow path.

7. The control valve of claim 6, wherein the pilot valve is configured to open when the pressurized fluid at said one end of the actuator reaches a predetermined pressure to provide fluid communication between said one end of the actuator and the control chamber.

8. The control valve of claim 7, wherein when the pilot valve is opened, pressurized fluid flows to the control chamber causing the flow metering operator to move within the passage and position the at least one metering slot to provide the flow path.

9. The control valve of claim 7, further including an electromagnetic device disposed on the pilot valve, the electromagnetic device being configured to adjust the predetermined pressure.

10. The control valve of claim 1, wherein said pressurized pilot supply includes a low pressure fluid source.

11. A method for controllably moving an output member of an actuator, comprising:
    supplying a pressurized pilot supply fluid to a passageway defined by a valve body, the passageway including a control chamber;
    selectively moving a pilot operator within the passageway;
    controllably moving a flow metering operator within the passageway to provide fluid communication between the actuator and a fluid reservoir;
    providing a fluid make-up operator in the passageway and in fluid communication with the fluid reservoir and the actuator,
    operating the fluid make-up operator to direct an amount of pressurized pilot supply fluid to the control chamber in response to a decrease in actuator pressure coinciding with a cavitation condition within the actuator; and
    activating one of said pilot operator and said fluid make-up operator to urge said flow metering operator to fluidly connect said actuator with said fluid reservoir under the influence of said pressurized fluid within said control chamber.

12. The method of claim 11, wherein said activating includes activating said fluid make-up operator to supply pressurized fluid from the pressurized pilot supply to the control chamber via at least one passage in the flow metering operator.

13. The-method of claim 11, providing the flow metering operator with at least one metering slot configured to provide a flow path fluidly connecting the fluid reservoir and the actuator.

14. The method of claim 13, wherein said operating the fluid make-up operator includes supplying pressurized fluid to the control chamber to urge the flow metering operator to move within the passageway and position the at least one metering slot to provide the flow path.

15. The method of claim 13, further including relieving pressurized fluid from one end of the actuator when the pressurized fluid reaches a predetermined pressure, wherein said relieving pressurized fluid includes opening a pilot valve to supply the pressurized fluid to the control chamber causing the flow metering operator to move within the passage and position the at least one metering slot to provide the flow path.

16. The method of claim 11, wherein said operating the fluid make-up operator includes slidably moving the fluid make-up operator in a passageway disposed in the flow metering operator.

17. The method of claim 11, further including relieving pressurized fluid from one end of the actuator when the pressurized fluid reaches a predetermined pressure.

18. The method of claim 17, wherein said relieving pressurized fluid includes providing fluid communication between said one end of the actuator and the control chamber.

19. The method of claim 16, further including adjusting the predetermined pressure with an electromagnetic device disposed on the pilot valve.

20. The method of claim 11, wherein said supplying a pressurized pilot supply fluid includes supplying pressurized fluid from a low pressure fluid source to the control chamber via at least one passage disposed in a passageway of the flow metering operator.

* * * * *